(12) United States Patent
Jeong et al.

(10) Patent No.: US 9,665,389 B2
(45) Date of Patent: May 30, 2017

(54) APPARATUS AND METHOD FOR PROVIDING VIRTUALIZATION SERVICES

(71) Applicant: SAMSUNG ELECTRONICS CO., LTD., Suwon-si (KR)

(72) Inventors: Bok-Deuk Jeong, Yongin-si (KR); Dae-Haeng Cho, Suwon-si (KR); Chan-Ju Park, Seoul (KR); Sung-Min Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 14/692,423

(22) Filed: Apr. 21, 2015

(65) Prior Publication Data

US 2015/0301850 A1    Oct. 22, 2015

(30) Foreign Application Priority Data

Apr. 22, 2014  (KR) .......................... 10-2014-0048082

(51) Int. Cl.
*G06F 9/455* (2006.01)
*G06F 9/445* (2006.01)
*H04W 12/06* (2009.01)
*G06F 9/44* (2006.01)

(52) U.S. Cl.
CPC ............ *G06F 9/45558* (2013.01); *G06F 8/63* (2013.01); *H04W 12/06* (2013.01); *G06F 9/4401* (2013.01); *G06F 2009/4557* (2013.01)

(58) Field of Classification Search
CPC .................................................. G06F 9/45558
USPC .......................................................... 718/1
See application file for complete search history.

(56) References Cited

U.S. PATENT DOCUMENTS

| | | | | |
|---|---|---|---|---|
| 2011/0265183 | A1* | 10/2011 | Wu | G06F 9/4401 726/24 |
| 2012/0291021 | A1* | 11/2012 | Banerjee | G06F 8/665 717/173 |
| 2013/0130651 | A1* | 5/2013 | Deasy | C09J 7/041 455/411 |
| 2013/0145448 | A1* | 6/2013 | Newell | G06F 21/31 726/7 |
| 2013/0239108 | A1 | 9/2013 | Lee et al. | |
| 2013/0318595 | A1 | 11/2013 | Wang et al. | |
| 2013/0339957 | A1* | 12/2013 | Azam | G06F 9/54 718/1 |
| 2014/0033194 | A1 | 1/2014 | Natchadalingam et al. | |
| 2015/0074764 | A1* | 3/2015 | Stern | H04L 63/06 726/4 |

OTHER PUBLICATIONS

Raja, Haroon; "Android Partitions Explained: boot, system, recovery, data, cache & misc"; Addictive Tips website (www.addictivetips.com); May 19, 2011.*

* cited by examiner

*Primary Examiner* — Qing Chen
*Assistant Examiner* — Clint Thatcher
(74) *Attorney, Agent, or Firm* — Sughrue Mion, PLLC (57) ABSTRACT

An apparatus and method for providing virtualization services in a mobile device are provided. The virtualization service providing apparatus includes an installer module configured to receive a hypervisor image and an agent for installing the hypervisor image, from a host server, a virtualization service module configured to store the hypervisor image and the agent and to transmit a request for rebooting the mobile device, in response to determining that the hypervisor image and the agent are authenticated by an authentication server, and a power management module configured to receive the request, and to reboot the mobile device.

16 Claims, 10 Drawing Sheets

APPARATUS AND METHOD FOR PROVIDING VIRTUALIZATION SERVICES

CROSS-REFERENCE TO RELATED APPLICATION(S)

This application claims priority from Korean Patent Application No. 10-2014-0048082, filed Apr. 22, 2014 in the Korean Intellectual Property Office, the entire disclosure of which is incorporated herein by reference.

BACKGROUND

1. Field

Apparatuses and methods consistent with exemplary embodiments relate to providing virtualization services, and more particularly, to a virtualization service providing apparatus and method capable of improving the stability of a system by booting up based on an authenticated hypervisor.

2. Description of the Related Art

Virtualization refers to the creation of a virtual version of a device or other resource such as a network, an operating system, a server, a storage device, and the like. Virtualization services according to the related art have been developed based on a Personal Computer (PC).

A virtualization service according to the related art may be provided based on a Compact Disc (CD) for executing the virtualization service, a Compact Disc-Read Only Memory (CD-ROM) designated to a booting disc, and a storage medium to store an installed hypervisor image. The virtualization service is installed by inserting a boot CD, and controlling a booting module to operate a hypervisor installer.

However, in the related art it is difficult to provide the virtualization service on a smart phone, because a mobile device does not have a CD-ROM drive and also cannot designate a boot loader.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a virtualization service providing apparatus and method capable of stably providing a virtualization service on a mobile device such as a smart phone, a tablet, an ultrabook, and the like.

One or more exemplary embodiments also provide a virtualization service providing apparatus and method that are capable of satisfying a user's requirements in view of security problems that can occur when a virtualization service is provided on a mobile device. For example, security can be increased by booting up an authenticated hypervisor when the virtualization service is provided on the mobile device.

According to an aspect of an exemplary embodiment, there is provided a virtualization service providing apparatus that provides a virtualization service in a mobile device, the virtualization service providing apparatus including an installer module configured to receive a hypervisor image from a host server; a virtualization service module configured to store the hypervisor image and to transmit a request for rebooting the mobile device, in response to the hypervisor image being authenticated by an authentication server, and a power management module configured to receive the request, and to reboot the mobile device.

According to an aspect of another exemplary embodiment, there is provided a virtualization service providing method for providing a virtualization service in a mobile device, the virtualization service providing method including receiving a hypervisor image from a host server, storing the hypervisor image and transmitting a request for rebooting the mobile device, in response to the hypervisor image being authenticated by an authentication server, and receiving the request, and rebooting the mobile device.

BRIEF DESCRIPTION OF THE DRAWINGS

The above and other aspects will be more apparent from the following description of exemplary embodiments taken in conjunction with the accompanying drawings, in which.

DETAILED DESCRIPTION

Hereinafter, exemplary embodiments will be described with reference to the appended drawings. However, specific structural and functional details disclosed herein are merely representative for purposes of describing the exemplary embodiments. It should be appreciated that exemplary embodiments of the present disclosure may be embodied in alternate forms and should not be construed as limited to example embodiments of the present disclosure set forth herein.

Accordingly, while the disclosure is susceptible to various modifications and alternative forms, specific embodiments thereof are shown by way of example in the drawings and are described herein in detail. It should be understood, however, that there is no intent to limit the disclosure to the particular forms disclosed, but on the contrary, the disclosure is to cover all modifications, equivalents, and alternatives falling within the spirit and scope of the disclosure.

It will be understood that, although the terms first, second, and the like may be used herein to describe various components, these components should not be limited by these terms. For example, the terms do not limit the order and/or importance of the components. These terms are only used to distinguish one component from another. For example, a first user device and a second user device that are user devices indicate different user devices. For example, a first component could be termed a second component, and, similarly, a second component could be termed a first component, without departing from the scope of the present disclosure. As used herein, the term "and/or" includes any and all combinations of one or more of the associated listed items The terminology used herein is for the purpose of describing exemplary embodiments only and is not intended to be limiting to the disclosure. As used herein, the singular forms "a", "an" and "the" are intended to include the plural forms as well, unless the context clearly indicates otherwise. It will be further understood that the terms "comprises" or "has", when used herein, specify the presence of stated features, integers, steps, operations, elements, components and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Throughout the drawings, like reference numerals will be understood to refer to like parts, components, and structures.

Figure 1:
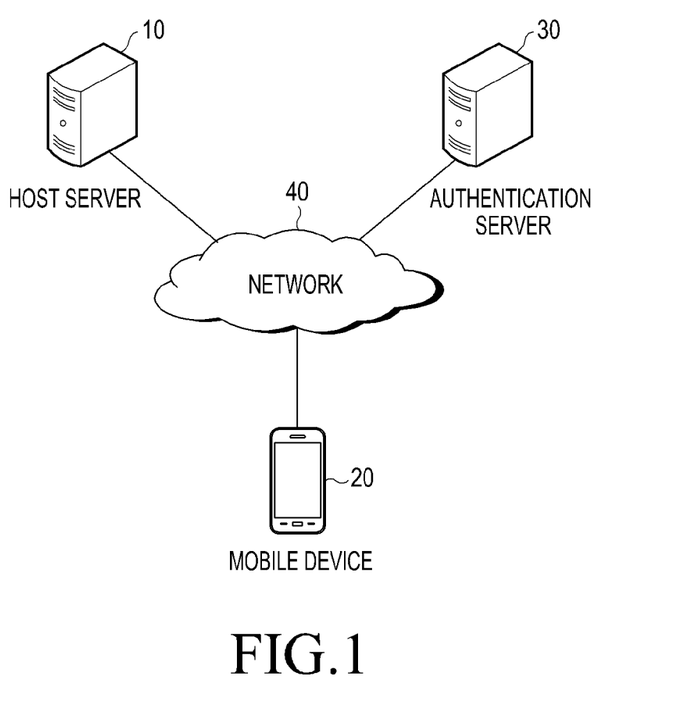
FIG. 1 illustrates a virtualization service providing system according to an exemplary embodiment.
Figure 2:
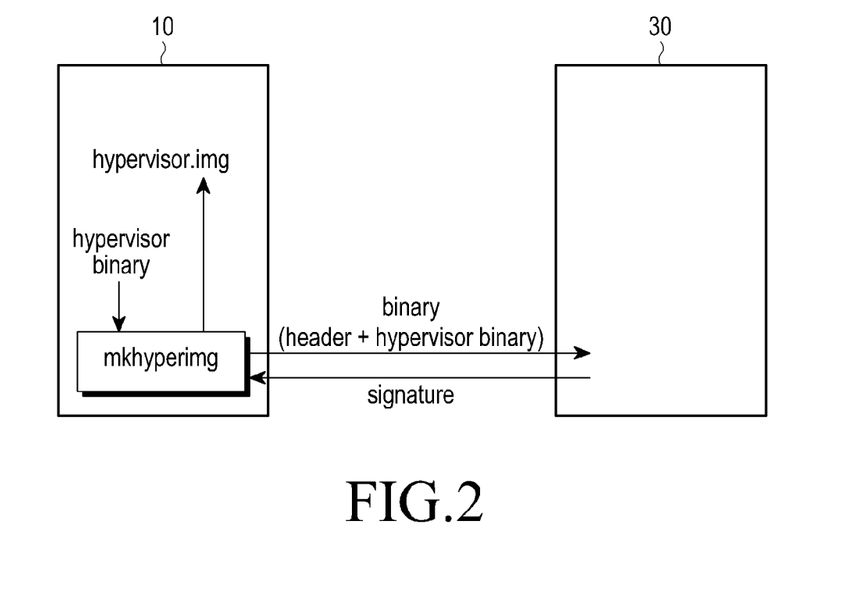
FIG. 2 is a diagram illustrating an operation of creating a hypervisor image, according to an exemplary embodiment.

FIG. 1 illustrates a virtualization service providing system according to an exemplary embodiment, and FIG. 2 is a diagram illustrating an operation of creating a hypervisor image, according to an exemplary embodiment.

Referring to FIGS. 1 and 2, the virtualization service providing system includes a host server 10, a mobile device 20, and an authentication server 30, which may be connected to each other through a network 40.

The host server 10 may store hypervisor binary data. The host server 10 may transmit an authentication request to the authentication server 30 to request and obtain authentication of the hypervisor binary. The authentication request may be sent to the authentication server 30 together with transmission of the hypervisor binary to the authentication server 30. The authentication server 30 may authenticate the hypervisor binary in response to the authentication request.

The authentication server 30 may transmit and the host sever 10 may receive a signature from the authentication server 30, in response to the authentication of the hypervisor being complete. For example, a signature provided by the authentication server 30 may be included in the hypervisor binary (also simply referred to as a hypervisor) that is authenticated by the authentication server 30 and the grouped data may be referred to as a hypervisor image (hypervisor.img). The host server 10 may transmit the hypervisor image and an agent for installing the hypervisor image to the mobile device 20, for example, according to a request from the mobile device 20. Also, the host server 10 may transmit various applications that can be executed by the mobile device 20, to the mobile device 20. The applications may be stored in the host server 10. Furthermore, the hypervisor image may also include a header and additional information for indicating that the hypervisor is authenticated, a type of agent for installing the hypervisor, and the like.

The mobile device 20 may be a smart phone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), a MP3 player, mobile medical equipment, a camera, or a wearable device (for example, a Head-Mounted-Device (HMD) such as electronic glasses, electronic clothes, electronic bracelet, electronic necklace, electronic accessory, electronic tattoo, or smart watch), a tablet, an ultrabook, an appliance, and the like. In this specification, for convenience of description, the mobile device 20 is described as a smart phone, however, it will be obvious to one of ordinary skill in the art that embodiments of the present disclosure are not limited thereto.

The authentication server 30 may perform authentication according to an authentication request from the host server 10. For example, the host server 10, the mobile device 20, and the authentication server 30 may be connected to the network 40 through wired/wireless communication. Examples of wireless communication include Wireless Fidelity (WiFi), Bluetooth (BT), Near Field Communication (NFC), Global Positioning System (GPS), cellular communication such as Long-Term Evolution (LTE), Long-Term Evolution Advanced (LTE-A), Code Division Multiple Access (CDMA), Wideband Code Division Multiple Access (WCDMA), Universal Mobile Telecommunications System (UMTS), Wireless Broadband (WiBro), Global System for Mobile Communications (GSM), and the like. The wired communication may include a Universal Serial Bus (USB), a High Definition Multimedia Interface (HDMI), Recommended Standard 232 (RS-232), a Plain Old Telephone Service (POTS), and the like.

Figure 3:
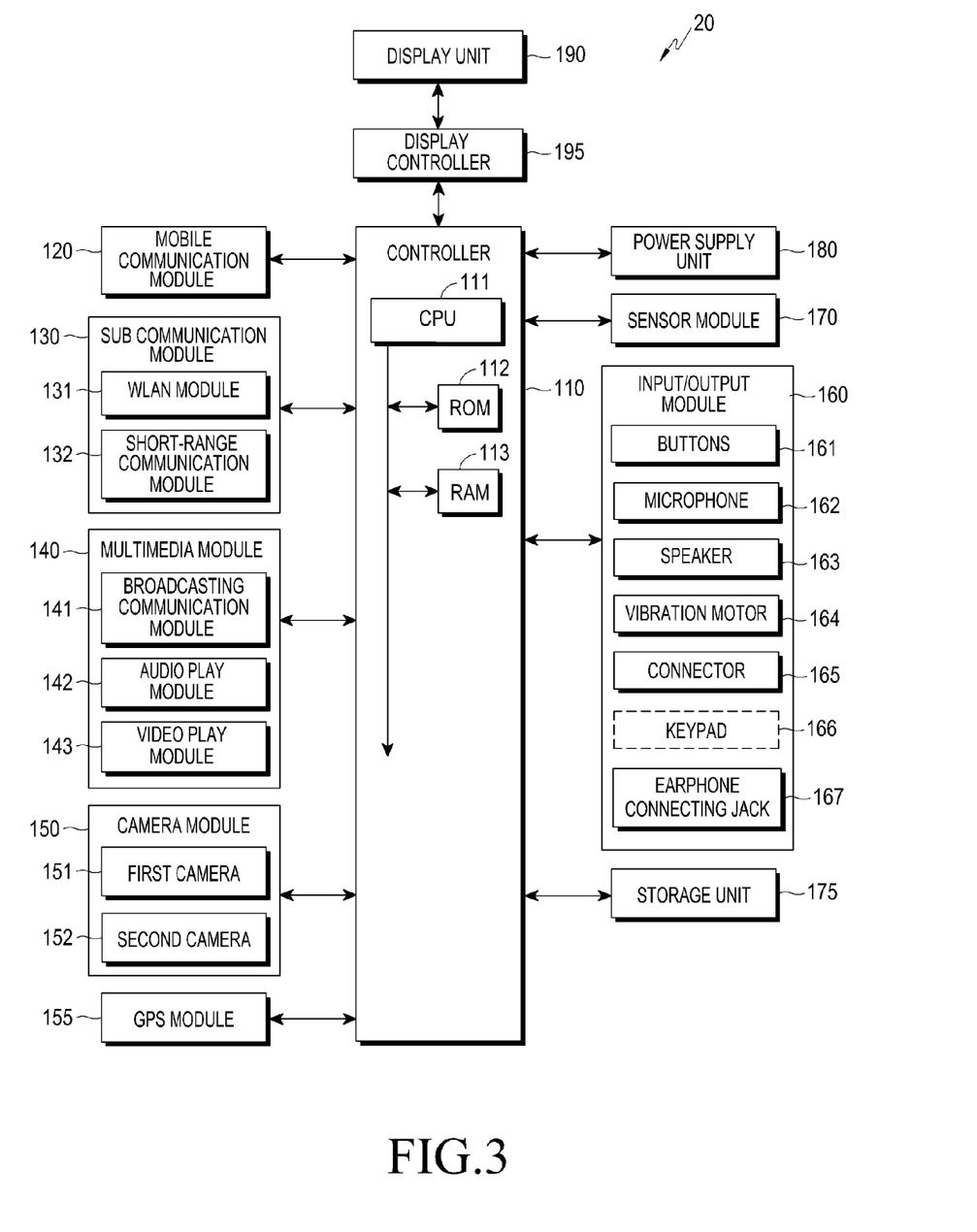
FIG. 3 is a block diagram illustrating a mobile device to which a virtualization service providing apparatus and a virtualization service providing method are applied, according to an exemplary embodiment.

FIG. 3 is a block diagram illustrating a mobile device to which a virtualization service providing apparatus and a virtualization service providing method are applied according to an exemplary embodiment.

Referring to FIG. 3, mobile device 20 may connect to an external device through an external device connecting unit, such as a sub communication module 130, connector 165, and earphone connecting jack 167. The external device may include various devices such as earphones, an external speaker, a Universal Serial Bus (USB) memory, a charger, a cradle, a docking station, a Digital Multimedia Broadcasting (DMB) antenna, a mobile payment-related device, healthcare equipment (for example, a blood glucose meter), a game, a navigation system, and the like, which can be detachably connected to the mobile device 20 in a wired fashion. Also, the external device may include a short-range communication device, such as a Bluetooth communication device and a Near Field Communication (NFC) device, which can be connected to the mobile device 20 in a wireless fashion through short-range communication, a WiFi Direct communication device, and a Wireless Access Point (WAP). Also, the external device may include another device, a mobile phone, a smart phone, a tablet PC, a desktop PC, a server, and the like.

Referring to FIG. 3, the mobile device 20 includes a display unit 190 and a display controller 195. For example, the display unit 190 and the display controller 195 may be a touch screen and a touch screen controller. Also, the mobile device 20 includes a controller 110, a mobile communication module 120, a sub communication module 130, a multimedia module 140, a camera module 150, a GPS module 155, an input/output module 160, a sensor module 170, a storage unit 175, and a power supply unit 180. The sub communication module 130 includes a wireless local area network (WLAN) module 131 and a short-range communication module 132, and the multimedia module 140 includes a broadcasting and communication module 141, an audio play module 142, and a video play module 143. The camera module 150 includes a first camera 151 and a second camera 152, and the input/output module 160 includes one or more buttons 161, a microphone 162, a speaker 163, a vibration motor 164, a connector 165, a keypad 166, and an earphone connecting jack 167.

The controller 110 includes a Central Processing Unit (CPU) 111, a Read Only Memory (ROM) 112 that may store control programs for controlling the mobile device 20, and a Random Access Memory (RAM) 113 that may temporarily store signals/data received from the outside of the mobile device 20 and which may be used as a workspace for operations performed by the mobile device 20. The CPU 111 may be configured with a single-core, a dual-core, a triple-core, a quad-core, and the like. Also, the CPU 111, the ROM 112, and the RAM 113 may be connected to each other through internal buses.

The controller 110 may control the mobile communication module 120, the sub communication module 130, the multimedia module 140, the camera module 150, the GPS module 155, the input/output module 160, the sensor module 170, the storage unit 175, the power supply unit 180, the display unit 190, and the display controller 195.

The mobile communication module 120 enables the mobile device 20 to connect to an external device through mobile communication using at least one antenna, under the control of the controller 110. For example, the mobile communication module 120 may transmit and receive radio signals for voice calls, video calls, Short Message Service (SMS) messages, Multimedia Message Service (MMS) messages, and the like, to and from a mobile phone, a smart phone, a tablet PC, or another device.

The sub communication module 130 may include at least one of the WLAN module 131 and the short-range communication module 132. For example, the sub communication module 130 may include one of the WLAN module 131 and the short-range communication module 132.

The WLAN module 131 may connect to the Internet at a place in which a wireless Access Point (AP) is installed, for example, under the control of the controller 110. The WLAN module 131 may support communication via IEEE 802.11x standards. The short-range communication module 132 may wirelessly perform short-range communication between the mobile device 20 and an imaging apparatus, under the control of the controller 110. The short-range communication may be through Bluetooth, Infrared Data Association (IrDA), WiFi Direct communication, NFC, and the like.

The mobile device 20 may include at least one of the mobile communication module 120, the WLAN module 131, and the short-range communication module 132, according to performance. For example, the mobile device 20 may include a combination of the mobile communication module 120, the WLAN module 131, and the short-range communication module 132, according to performance.

In the multimedia module 140, the broadcasting communication module 141 may receive, under the control of the controller 110, broadcasting signals, for example, TV broadcasting signals, radio broadcasting signals, data broadcasting signals, and the like, and additional broadcasting information, for example, an Electric Program Guide (EPG), an Electric Service Guide (ESG), and the like, transmitted from a broadcasting station. The audio play module 142 may play, under the control of the controller 110, a digital audio file. For example, the digital audio file may include a file extension such as ".mp3", ".wma", ".ogg", ".wav", and the like, which are stored in the storage unit 175 or received from the outside. The video play module 143 may play, under the control of the controller 110, a digital video file with a file extension such as ".mpeg", ".mpg" ".mp4", ".avi", ".mov", ".mkv", and the like, or a digital audio file that is stored in the storage unit 175 or received from the outside.

The multimedia module 140 may include the audio play module 142 and the video play module 143, excluding the broadcasting and communication module 141. As another example, one or more of the audio play module 142 or the video play module 143 of the multimedia module 140 may be incorporated into the controller 110.

In the camera module 150, the first camera 151 and the second camera 152 may photograph still images or moving images under the control of the controller 110. The first camera 151 or the second camera 152 may include an auxiliary light source such as a flash that provides an amount of light for photographing. The first camera 151 may be disposed on the front part of the mobile device 20, and the second camera 152 may be disposed on the rear part of the mobile device 20. Alternatively, the first camera 151 and the second camera 152 may be disposed adjacent to each other to photograph 3D still images or 3D moving images.

The GPS module 155 may receive radio waves from a plurality of GPS satellites that orbit around the earth, and calculate the location of the mobile device 20 based on a time of arrival of the radio waves from the GPS satellites to the mobile device 20.

The input/output module 160 may include, as described above, one or more buttons 161, the microphone 162, the speaker 163, the vibration motor 164, the connector 165, and the keypad 166. The buttons 161 may be provided in the front, side, and/or rear part of the housing of the mobile device 20. The buttons 161 may include at least one of a power/lock button, volume buttons, a menu button, a home button, a back button, and a search button.

The microphone 162 may receive speech or other sounds and generate an electrical signal corresponding to the speech, under the control of the controller 110. The speaker 163 may receive, under the control of the controller 110, sound corresponding to various signals, for example, radio signals, broadcasting signals, a digital audio file, a digital video file, photo-shooting tones, and the like, from the mobile communication module 120, the sub communication module 130, the multimedia module 140, the camera module 150, and the like, and output the sound from the mobile device 20. Also, the speaker 163 may output sound such as button manipulation tones or ring back tones corresponding to a function that is performed by the mobile device 20. The speaker 163 may be provided as at least one unit at an appropriate location (or locations) on the housing of the mobile device 20. As another example, earphones may be inserted into the earphone connecting jack 168 and connected to the mobile device 20 to receive sound output from the mobile device 20.

The vibration motor 164 converts an electrical signal into mechanical vibrations under the control of the controller 110. For example, while the mobile device 20 is in a vibration mode, the vibration motor 164 may operate if a voice call is received from another device. The vibration motor 164 may be provided as at least one unit in the housing of the mobile device 20. The vibration motor 164 may operate in response to a user's touch input on the display unit 190 or a user's touch-and-drag input of touching and dragging the display unit 190.

The connector 165 may be used as an interface for connecting the mobile device 20 to an external device or a power source. The mobile device 20 may transmit data stored in the storage unit 175 of the mobile device 20 to an external device through a wired cable connected to the connector 165, under the control of the controller 110, or the mobile device 20 may receive data of an external device through the wired cable connected to the connector 165. The external device may be a docking station, and the data may be an input signal transferred from an external input device, for example, a mouse, a keyboard, and the like. The mobile device 20 may receive power or charge a battery from a power source through the wired cable connected to the connector 165. As another example, the mobile device 20 may receive power wirelessly.

The keypad 166 may receive key input from a user in order to control the mobile device 20. The keypad 166 may be a physical keypad that is provided on the mobile device 20, or a virtual keypad that is displayed on a touch screen of the display unit 190. The mobile device 20 may not include a physical keypad according to a structure or performance of the mobile device 20.

The sensor module 170 may include at least one sensor for detecting a status of the mobile device 20. For example, the sensor module 170 may include a proximity sensor for detecting a user's proximity to the mobile device 20, an ambient light sensor for measuring an amount of ambient light around the mobile device 204, and the like. Also, the sensor module 170 may include a gyro sensor that may detect a motion such as a rotation, acceleration, or vibration applied to the mobile device 20 using a magnetic field of the earth, or the direction of gravity. Also, the sensor module 170 may include an altimeter to measure atmospheric pressure to detect an altitude. At least one of the aforementioned sensors may detect a state of the mobile device 20, generate a signal corresponding to the detected state, and transmit the signal to the controller 110.

The storage unit 175 may store signals or data that is input/output according to operations of the mobile communication module 120, the sub communication module 130, the multimedia module 140, the camera module 150, the GPS module 144, the input/output module 160, the sensor module 170, and the display unit 190, under the control of the controller 110. The storage unit 175 may store control programs and applications for controlling the mobile device 20 or the controller 110.

In this description, the term a storage unit may refer to the storage unit 175, the ROM 112 or RAM 113 included in the controller 110, and a memory card, for example, a Secure Digital (SD) card or a memory stick installed in the mobile device 20. The storage unit 175 may be a non-volatile memory, a volatile memory, a Hard Disk Drive (HDD), a Solid State Drive (SSD), and the like.

The power supply unit 180 may supply power to one or more batteries that are installed in the housing of the mobile device 20, under the control of the controller 110. The batteries may supply power to the mobile device 20. Also, the power supply unit 180 may supply power received from an external power source through a wired cable connected to the connector 165, to the mobile device 20. Also, the power supply unit 180 may supply power received wirelessly from an external power source through a wireless charge technique, to the mobile device 20.

The touch screen 190 may provide a user with User Interfaces (UIs) corresponding to various services, for example, a call, data transmission, broadcasting, photographing, and the like. The touch screen 190 may output an analog signal corresponding to a touch input to a UI detected by the display controller 195. The touch screen 190 may receive a touch input from a user, for example, a user's finger or a pointing unit such as a stylus pen. Also, the touch screen 190 may receive a touch-and-drag input. In this case, the touch screen 190 may transmit an analog signal corresponding to the touch-and-drag input to the touch screen controller 195.

In this specification, the term "touch" is not limited to a contact of a user's body part or a pointing device to the touch screen of the display unit 190, and may include non-contact or indirect recognition. A recognition distance in which the touch screen can recognize the user's body part or the pointing device may depend on the performance or structure of the mobile device 20. The touch screen may be a resistive touch screen, a capacitive touch screen, an infrared touch screen, an acoustic wave touch screen, and the like.

The display controller 195 may convert analog signals received from the touch screen of the display unit 190 into digital signals (for example, X and Y coordinates), and transfer the digital signals to the controller 110. The controller 110 may control the touch screen of the display unit 190 using digital signals received from the display controller 195. For example, the controller 110 may select a shortcut icon displayed on the touch screen 190 or execute the shortcut icon, in response to a touch input. The display controller 195 may be included in the controller 110.

Figure 4:
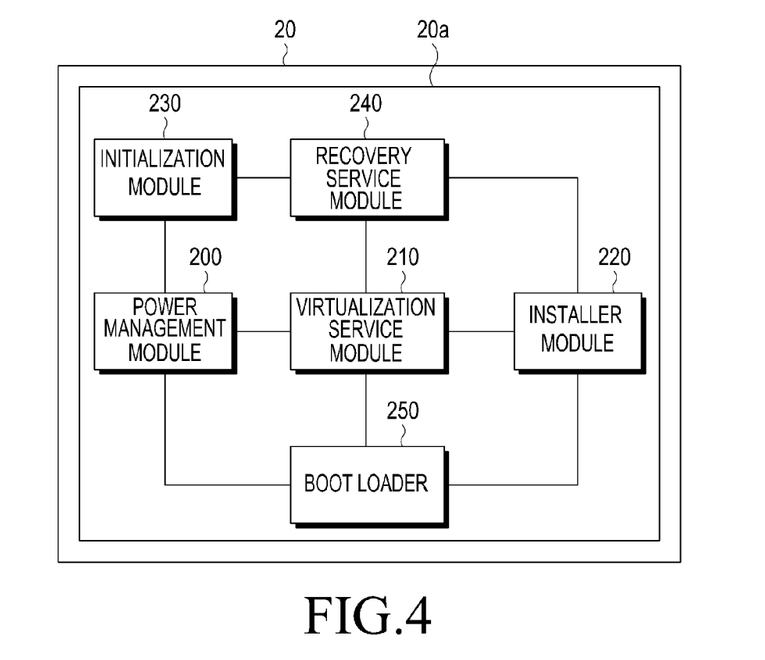
FIG. 4 is a block diagram illustrating a virtualization service providing apparatus according to an exemplary embodiment.

FIG. 4 is a block diagram illustrating a virtualization service providing apparatus according to an exemplary embodiment.

Referring to FIG. 4, virtualization service providing apparatus 20a includes a power management module 200, a virtualization service module 210, an installer module 220, an initialization module 230, a recovery service module 240, and a boot loader 250. Examples of the virtualization service providing apparatus 20a are described with reference to FIGS. 5 to 11, below.

Figure 5:
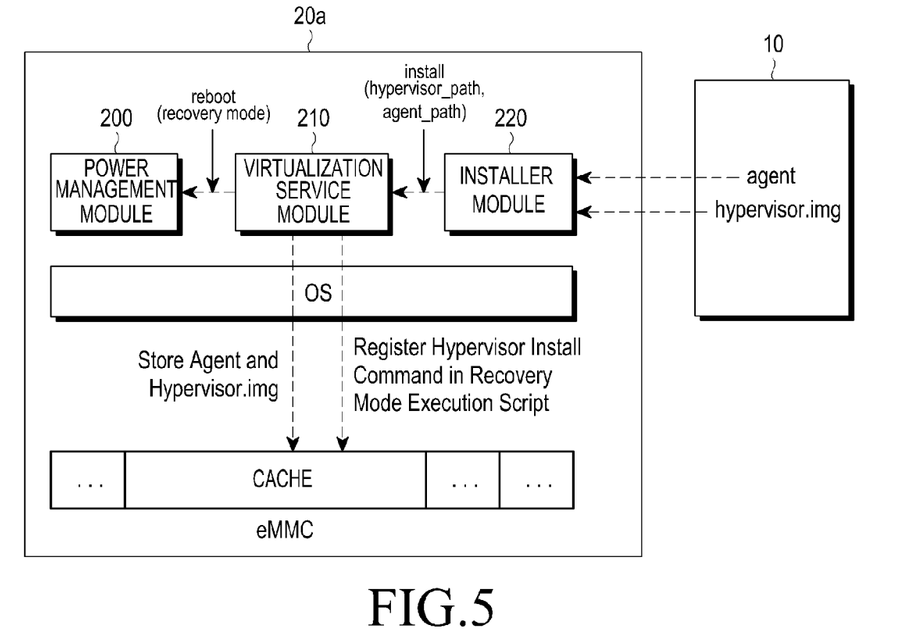
FIG. 5 is a diagram illustrating a user-level application for installing a hypervisor, according to an exemplary embodiment.

FIG. 5 is a diagram illustrating an operation of a user-level application for installing hypervisor, according to an exemplary embodiment.

Referring to FIG. 5, the installer module 220 may receive a hypervisor image and an agent for installing the hypervisor image from a server 10, to install the hypervisor image. Then, the installer module 220 may access the virtualization service module 210, and transmit paths (i.e. hypervisor_path and agent_path) of the hypervisor image and the agent to the virtualization service module 210.

The virtualization service module 210 may determine whether the agent is an agent authenticated by the authentication server 30 (see FIG. 1). For example, whether the agent is an authenticated agent may be determined by checking whether the agent includes a signature provided by the authentication server 30.

In response to the virtualization service module 210 determining that the agent is an authenticated agent, the virtualization service module 210 may store the hypervisor image and the agent, for example, in a predetermined partition of an embedded Multi Media Card (eMMC) of the mobile device 20. The predetermined partition may allow access to the virtualization service module 210 that operates with a predetermined privilege level. The virtualization service module 210 may create a script for installing the hypervisor, and store the script in the predetermined partition. For example, the script may be "virtualization_install [install|update|remove][installer module private parameters]". The script may be a script for installing the hypervisor upon rebooting into a recovery mode which will be described later.

Also, the virtualization service module 210 may store the script in a partition and/or directory that an application operating with a predetermined privilege level can access. For example, in an Android® Operating System (OS), the virtualization service module 210 may store the agent and the hypervisor in a /cache/virtualization directory which is a lower directory of a /cache directory mounted on a cache partition. Also, in the recovery mode which will be described later, the recovery service module 240 may add the script in a command file which is a lower layer of /cache/recovery/.

After creating and storing the script, the virtualization service module 210 may request the power management module 200 to reboot the mobile device 20. For example, the virtualization service module 210 may request the power management module 200 to reboot the mobile device 20 into the recovery mode. In response, the power management module 200 may control the mobile device 20 such that the mobile device 20 is rebooted.

Figure 8:
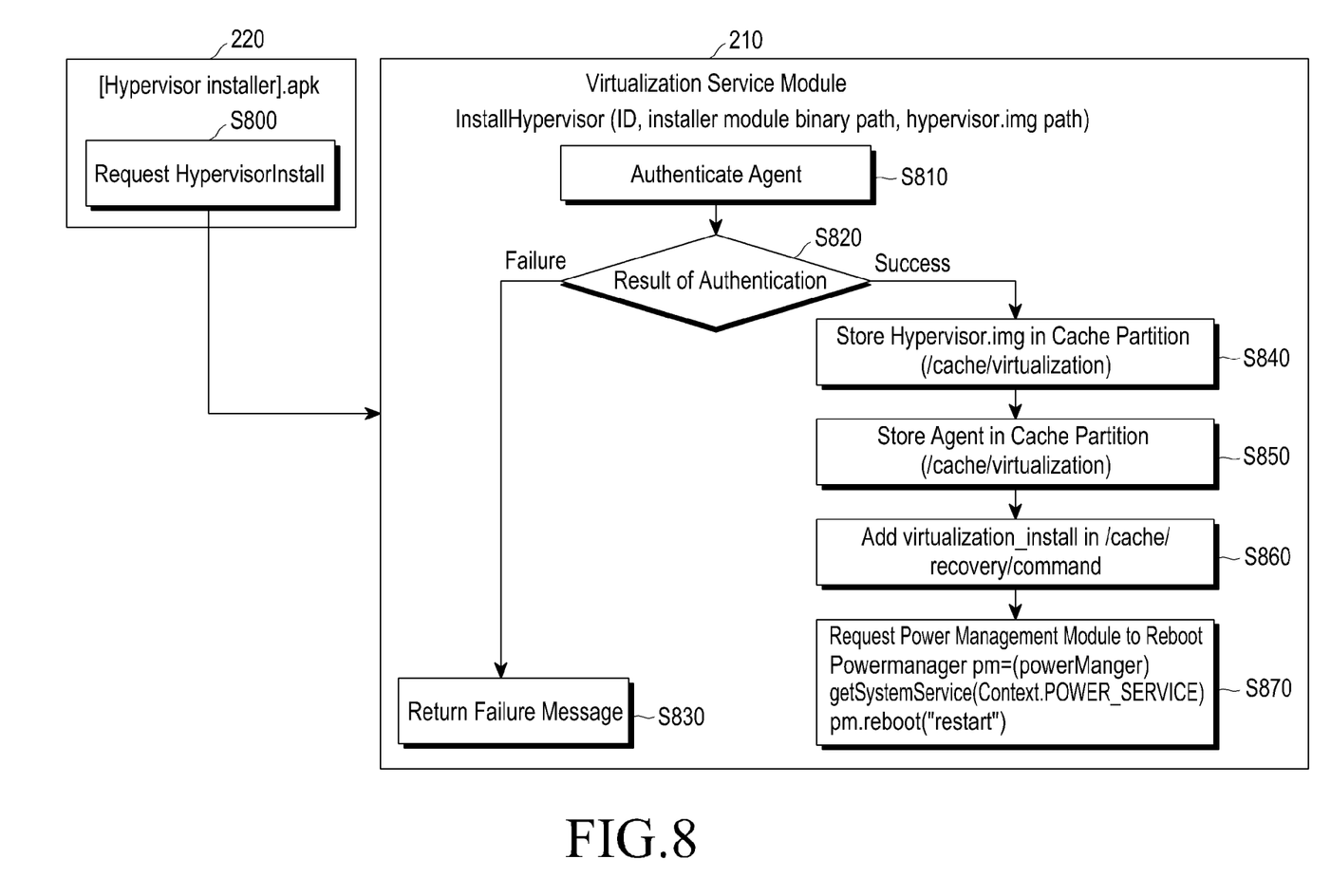
FIG. 8 is a flowchart illustrating a method of a user-level application for installing a hypervisor, according to an exemplary embodiment.

A flowchart related to the operation of the user-level application illustrated in FIG. 5 is illustrated in FIG. 8. That is, FIG. 8 is a flowchart illustrating an operation of a user-level application for installing a hypervisor, according to an exemplary embodiment.

Referring to FIGS. 5 and 8, installer module 220 requests the virtualization service module 210 to install a hypervisor, in operation S800. Then, the virtualization service module 210 attempts to authenticate an agent and determines a result of the authentication in operations S810 and S820. If the authentication of the agent fails, the virtualization service module 210 returns a failure message to the virtualization service module 210, in operation S830.

However, if the authentication of the agent is successful, the virtualization service module 220 stores a hypervisor image and the agent in a cache partition, in operations S840 and S850. The virtualization service module 210 adds a script, for example, virtualization_install to /cache/recovery/ command, in operation S860. After adding the script, the virtualization service module 210 requests the power management module 200 to reboot the mobile device 20 into the recovery mode, in operation S870.

Figure 6:
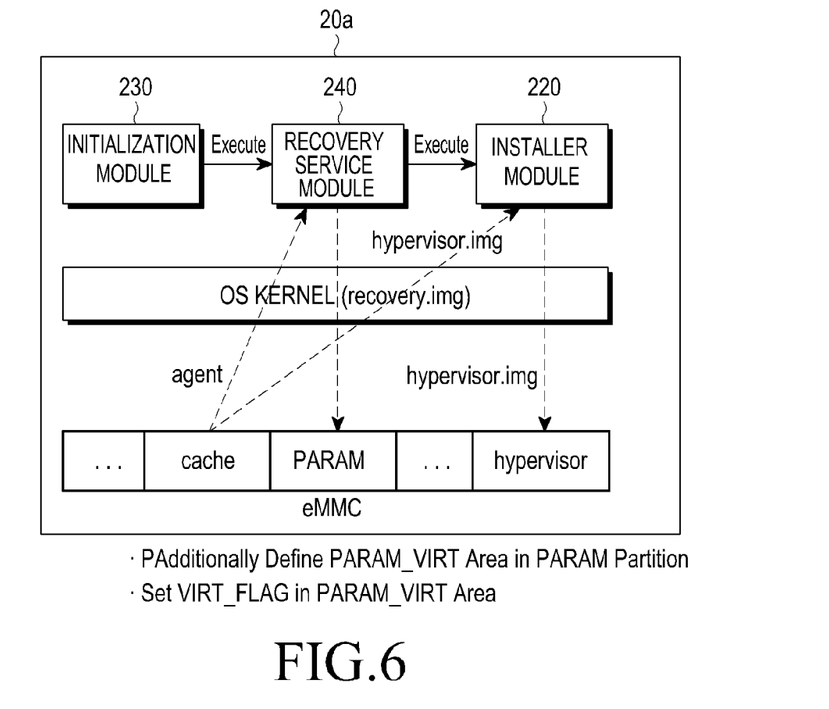
FIG. 6 is a diagram illustrating an operation of installing a hypervisor, according to an embodiment of the present disclosure.
Figure 9:
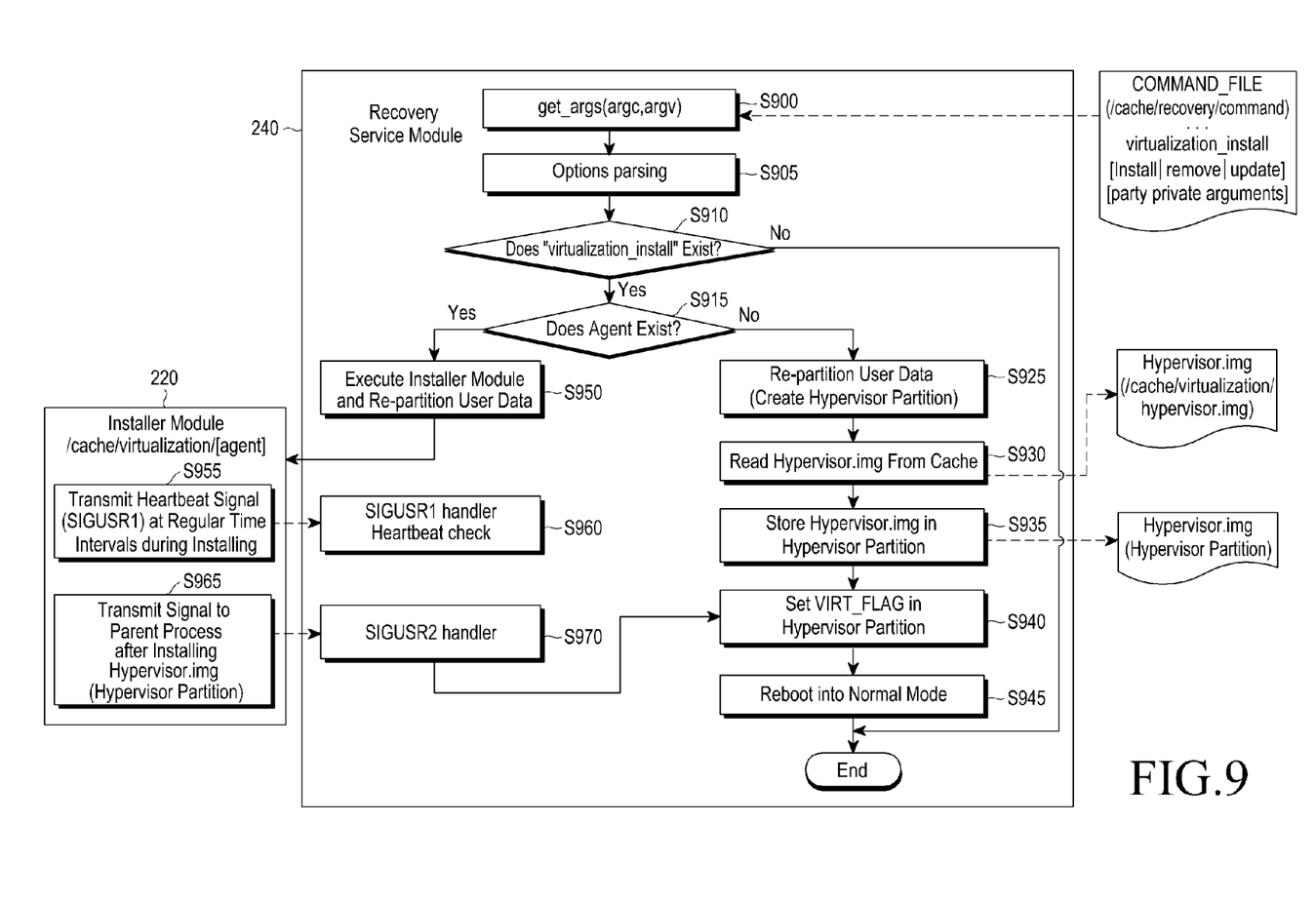
FIG. 9 is a flowchart illustrating a method of installing a hypervisor, according to an exemplary embodiment.

FIG. 6 is a diagram of an operation of installing a hypervisor, according to an exemplary embodiment, and FIG. 9 is a flowchart of a method of installing a hypervisor, according to an exemplary embodiment.

Referring to FIGS. 6 and 9, after the mobile device 20 is rebooted into the recovery mode, the initialization module 230 may perform an initialization for installing the hypervisor. After initialization in the recovery mode, the recovery service module 240 may determine whether a "virtualization_install" script exists in a cache/virtualization directory.

If the recovery service module 240 determines that the "virtualization_install" script exists in the cache/virtualization directory, the recovery service module 240 may determine whether an agent exists, and if an agent exists, the recovery service module 240 may install the hypervisor through the agent. In order to install the hypervisor, the recovery service module 240 may include a hypervisor install launcher.

Figure 12:
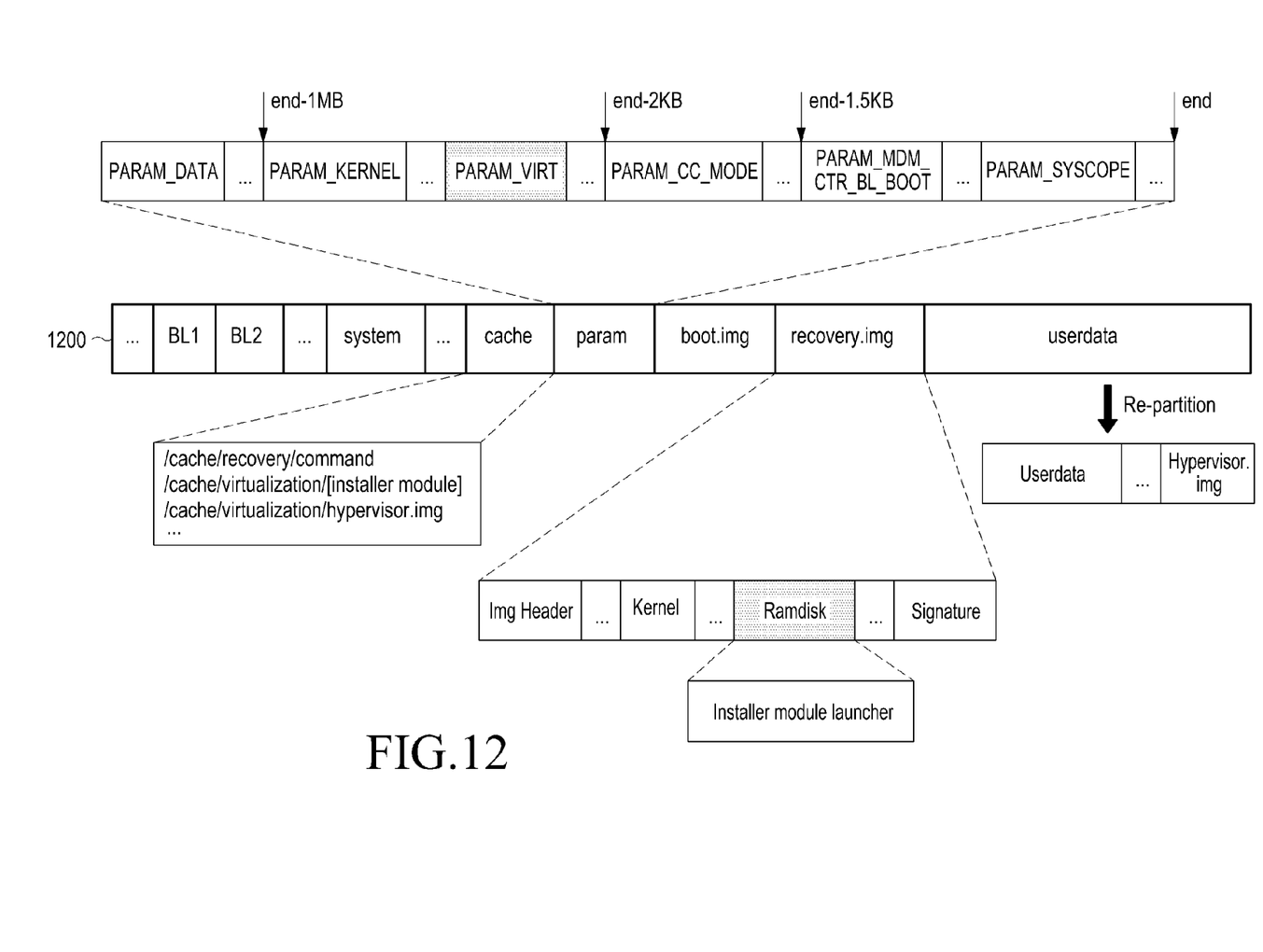
FIG. 12 illustrates a layout of storage medium for providing a virtualization service, according to an exemplary embodiment.

In some examples, the mobile device 20 may not include an agent installed therein. If the recovery service module 240 determines that no agent exists, the recovery service module 240 may dynamically re-partition the eMMC, and store the hypervisor image in the re-partitioned partition. A conceptual view for a dynamically re-partitioned memory is shown in FIG. 12. In this example, the recovery service module 240 may re-partition a "userdata" partition which corresponds to a tail region of the memory. If an installed agent exists in the mobile device 20, the re-partition may be performed by the agent. As another example, if no installed agent exists in the mobile device 20, the re-partition may be performed by the recovery service module 240. Accordingly, the module that performs the re-partition may depend on whether or not an installed agent exists in the mobile device 20.

The re-partitioned memory may be removed by a user. An operation of removing the re-partitioned memory may be performed by the agent that is controlled by the hypervisor install launcher. As another example, if an installed agent is not included in the mobile device 20, the re-partitioned partition may be removed by the recovery service module 240.

If the agent receives a request for removing re-partitioned partitions, the agent may remove partitions that were created to install the hypervisor. For example, whether to execute installing, updating, or removing may be determined based on a parameter value of a command script. Accordingly, an install command, an update command, a remove command, and the like, may be transferred as argument to the agent when the recovery mode is initialized.

Figure 14:
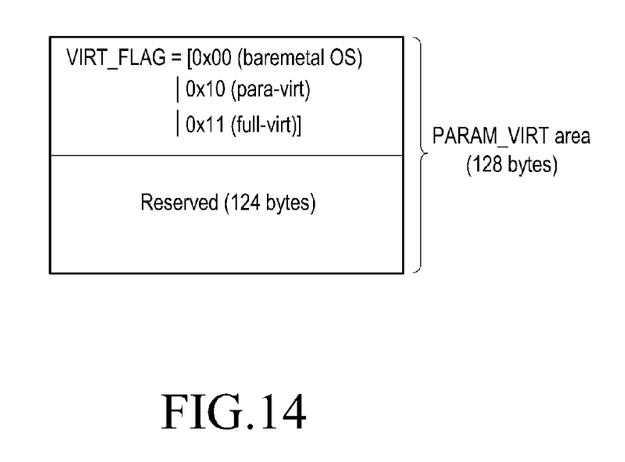
FIG. 14 is a diagram illustrating types of flag values according to an exemplary embodiment.

If the hypervisor is finished installing, the recovery service module 240 may create a flag value VIRT_FLAG representing that the hypervisor has been installed, and store the flag VIRT_FLAG in a predetermined partition of the eMMC. For example, the flag value VIRT_FLAG may be stored in a PARAM partition that is accessed by, for example, the boot loader 250. The flag value VIRT_FLAG may be encrypted for security purposes, and may allow code recovery through a Cyclic Redundancy Check (CRC). The flag value VIRT_FLAG may have three types, for example, 0x00, 0x10, and 0x11, which are shown in the example of FIG. 14. In some embodiments, the flag value VIRT_FLAG may be induced using its encrypted flag value. Accordingly, it is possible to encrypt a serial number of the mobile device 20 through a nonce. The nonce is a value that is used together with a key value in order to encrypt predetermined data. Different devices may be allocated different nonce.

Referring to FIG. 9, the recovery service module 240 retrieves an argument, in operation S900, and parses the argument, in operation S905. Then, the recovery service module 240 determines whether a "virtualization_install" script exists, in operation S910, and if the recovery service module 240 determines that a "virtualization_install" script exists, the recovery service module 240 determines whether an agent exists, in operation S915. If the recovery service module 240 determines that an agent exists in operation S915, the recovery service module 240 executes the installer module 220, in operation S950. While installing the hypervisor, for example, the installer module 220 transmits a signal (a heartbeat signal, SIGUSR1) informing that installing is normally performed in operation S955, to the recovery service module 240, at regular time intervals.

The recovery service module 240 checks the signal in operation S960, and determines whether the hypervisor is normally installed. After the hypervisor is completely installed, the installer module 220 transmits a signal SIGUSR2 indicating that the hypervisor is completely installed, to the recovery service module 240, in operation S965. The recovery service module 240 receives the signal SIGUSR2, and determines that the hypervisor has been completely installed, in operation S970.

In order to check the signals SIGUSR1 and SIGUSR2, the recovery service module 240 may include a handler. If the hypervisor is completely installed, the recovery service module 240 sets the flag value VIRT_FLAG in the PARAM partition, in operation S940. An example of setting the flag value is also shown in FIG. 12. After setting the flag value VIRT_FLAG, that is, after the hypervisor image has been completely installed, the recovery service module 240 requests the power management module 200 to reboot the mobile device 20 into a normal mode, in operation S945. In some embodiments, after operation S940, the recovery service module 240 may delete the installed hypervisor image according to a request from a user. The request from the user for deleting the hypervisor image may be received through a predetermined User Interface (UI) that is provided by a hypervisor service.

However, if no agent exists in operation S915, the recovery service module 240 re-partitions, for example, the user-data partition to create a hypervisor partition, in operation 5925. Thereafter, the recovery service module 240 reads a hypervisor image from a cache, in operation 5930, and stores the hypervisor image in the hypervisor partition, in operation 5935. Accordingly, operations S940 and S945 are then performed.

Figure 7:
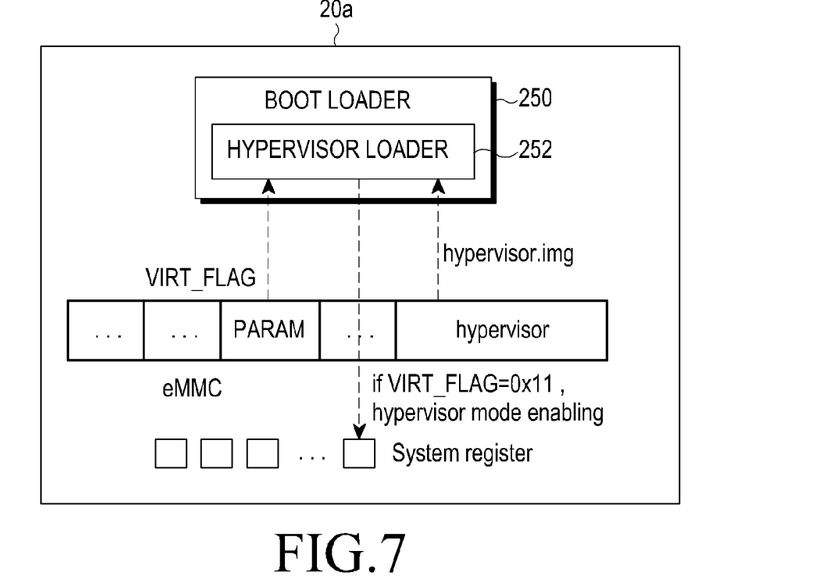
FIG. 7 is a diagram illustrating booting through a virtualization service providing apparatus according to an exemplary embodiment.

FIG. 7 is a diagram illustrating booting through a virtualization service providing apparatus 20*a* according to an exemplary embodiment.

Referring to FIG. 7, the boot loader 250 may access the eMMC for booting, and read the flag value VIRT_FLAG stored in the PARAM partition. This operation may be performed by a hypervisor loader 252 included in the boot loader 250. The boot loader 250 may determine whether to perform booting based on predetermined OS (for example, host OS) or to perform booting into a hypervisor mode, according to the flag value VIRT_FLAG. The boot loader 250 may be software, firmware, hardware, or a combination of two or more of the aforementioned devices. Examples of functions or operations that are performed by the boot loader 250 are described in detail with reference to FIGS. 10 and 11, below.

Figure 10:
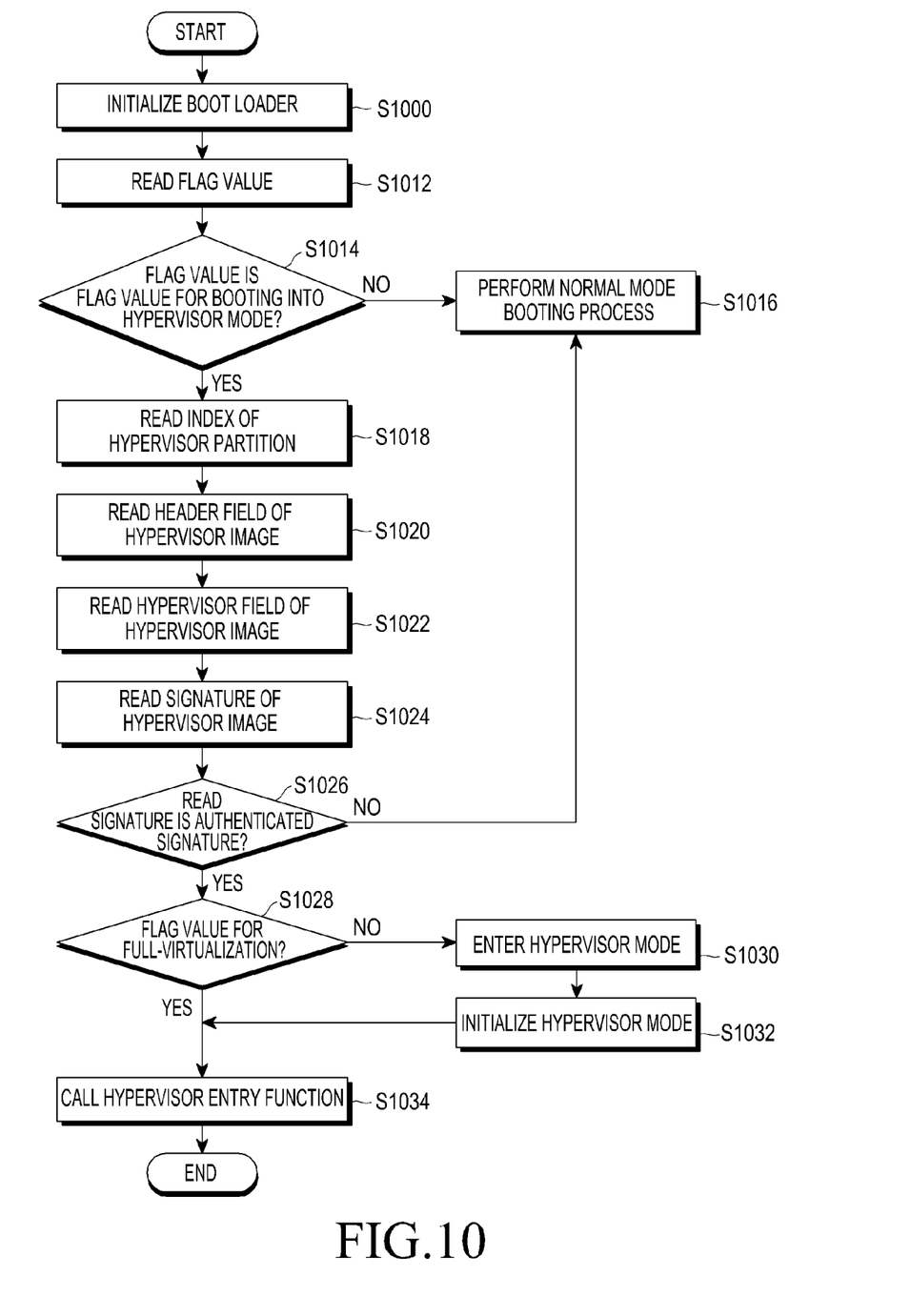
FIG. 10 is a flowchart illustrating a method of booting through a virtualization service providing method according to an exemplary embodiment.
Figure 11:
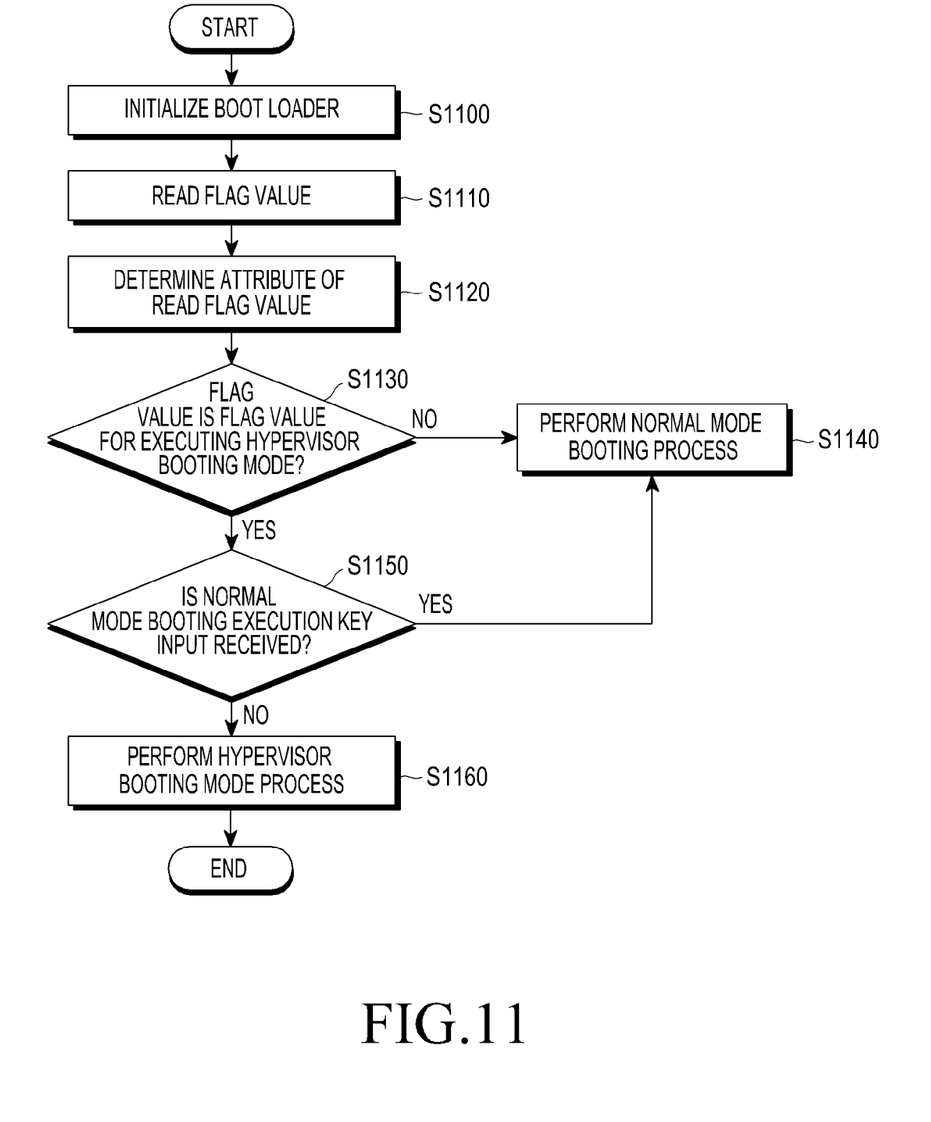
FIG. 11 is a flowchart illustrating a method of booting through a virtualization service providing method according to another exemplary embodiment.

FIG. 10 is a flowchart illustrating a method of booting through a virtualization service providing method according to an exemplary embodiment, and FIG. 11 is a flowchart illustrating booting through a virtualization service providing method according to another exemplary embodiment.

Referring to FIGS. 4 and 10, the boot loader 250 is initialized for booting, in operation S1000, and reads a flag value stored in the PARAM partition, in operation S1012.

The boot loader 250 may be initialized by the virtualization service module 210. The boot loader 250 determines whether the flag value is a flag value for booting into a hypervisor mode, in operation S1014. For example, the flag value for booting into the hypervisor mode may be 0x10 or 0x11, as shown in FIG. 14, wherein 0x10 indicates a hypervisor mode that operates based on para-virtualization and 0x11 indicates a hypervisor mode that operates based on full-virtualization. However, the flag value may be set to another value. If the recovery service module 240 stores a flag value in the PARAM partition, the recovery service module 240 may determine the flag value according to whether the mobile device 20 supports para-virtualization or full-virtualization. The full-virtualization refers to a method of virtualizing hardware itself without correcting a guest OS such as a virtual machine (VM), and the para-virtualization refers to a method in which guest OS processes use of a CPU or memory, instead of virtualizing all parts of hardware.

If the flag value is not a flag value for booting into the hypervisor mode, the boot loader 250 performs a normal mode booting process, in operation S1016. The normal mode booting process may be booting based on a host OS.

Figure 13:
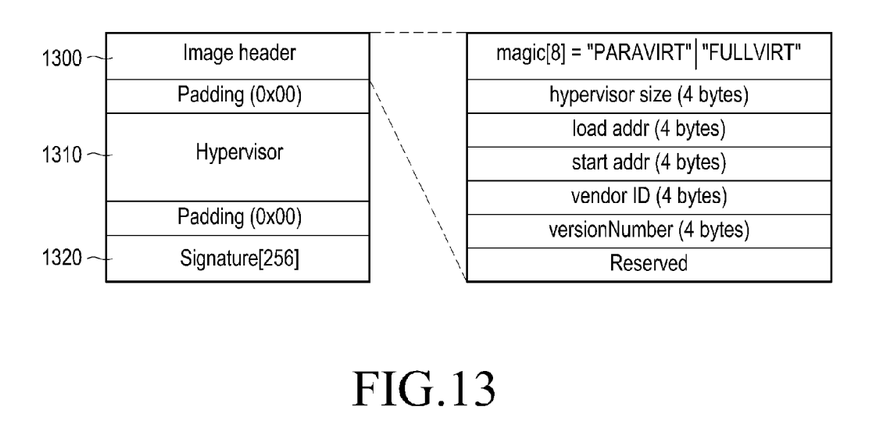
FIG. 13 illustrates a hypervisor image and a header field of the hypervisor image, according to an exemplary embodiment.

If the flag value is a flag value for booting into the hypervisor mode, the boot loader 250 reads an index of the hypervisor partition, in operation S1018, and reads a header field 1300 (see FIG. 13) of a hypervisor image based on the index, in operation 1020. An example of the header field 1300 is shown in FIG. 13, and is composed of a hypervisor size field, a load address field, a start address field, a vender ID field, a version number field, and a reserved field. The boot loader 250 reads a hypervisor field 1310 of the hypervisor image, based on information of the header field 1300, for example, based on the hypervisor size information, in operation 1022. Through operation S1022, the boot loader 250 may acquire a hash value of the hypervisor image to determine whether the hypervisor image includes an authenticated signature. Then, the boot loader 250 reads a signature included in the hypervisor image, in operation 1024, and determines whether the read signature is a signature that has been authenticated by the authentication server 30, in operation S1026. Whether the read signature is an authenticated signature may be determined by checking the hash value of the hypervisor image stored in the hypervisor field 1310, acquired through operation S1022, and determining whether the hash value is identical to a hash value for a signature stored in a hypervisor signature field 1320.

If the boot loader 250 determines that the read signature is an authenticated signature, the boot loader 250 determines whether the flag value is a flag value for full-virtualization, that is, whether the flag value is a value indicating a hypervisor mode that operates based on full-virtualization or para-virtualization, in operation S1028.

If the boot loader 250 determines that the flag value is a value indicating a hypervisor mode that operates based on full-virtualization, for example, if VIRT_FLAG=0x11, the boot loader 250 calls a hypervisor entry function, in operation S1034. If the boot loader 250 determines that the flag value is a value indicating a hypervisor mode that operates based on para-virtualization, for example, if VIRT_FLAG=0x10, the boot loader 250 enters the hypervisor mode, in operation S1030, and initializes the hypervisor mode to perform booting based on para-virtualization, in operation S1032. After initializing the hypervisor mode, the boot loader 250 calls a hypervisor entry function, in operation S1034.

In some examples, a user may want to perform booting based on host OS, instead of booting into the hypervisor mode. As another example, as shown in FIG. 11, although a condition for booting into the hypervisor mode is satisfied, whether a request for booting into a normal mode is received according to a user input of selecting a normal mode booting execution key is determined in operation S1150, and if a request for booting into a normal mode is received, the boot loader 250 performs a normal mode booting process, in operation S1140. In some embodiments, a request for booting into the normal mode may be received when a user selects to boot into a normal mode through a selection message provided to the user upon booting into the hypervisor mode. If no request for booting into a normal mode is received from the user, the hypervisor booting mode process described above with reference to FIG. 10, for example, operations following operation S1018 of FIG. 10 may be performed, in operation S1160. In the embodiment of FIG. 11, operation S1150 of requesting booting into the normal mode is performed after operation S1130, however, operation S1150 may be performed at any time when the hypervisor booting mode process is performed (see FIG. 10).

Because the other function(s) or operation(s) of FIG. 11 have been described above with reference to FIGS. 7 to 10, detailed descriptions therefor will be omitted here.

In some embodiments, the function(s) or operation(s) that are performed by the virtualization service providing apparatus 20a may be controlled by the controller 110.

The term "unit" and/or "module" used in the various embodiments of the present disclosure may refer to, for example, hardware, software, firmware, or a combination thereof. The term "unit" and/or "module" may be interchangeably used with another term, such as "logic", "logical block", "component", or "circuit". The "unit" and/or "module" may be implemented mechanically or electronically. For example, the "unit" and/or "module" may include at least one of an hardware processor, an Application-Specific Integrated Circuit (ASIC) chip, Field-Programmable Gate Arrays (FPGAs), or a programmable-logic device, which performs certain operations, already developed or to be developed in future.

According to the exemplary embodiments of the present disclosure, a user may easily install hypervisor in a mobile device without having particular knowledge about the hypervisor. Furthermore, by determining whether a hypervisor is authenticated by an authentication server and providing the authenticated hypervisor to a mobile device, a virtualization service can be stably provided to the mobile device.

The methods described above can be written as a computer program, a piece of code, an instruction, or some combination thereof, for independently or collectively instructing or configuring a processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A virtualization service providing apparatus that provides a virtualization service in a mobile device, the virtualization service providing apparatus comprising:
 a non-transitory memory; and
 a processor configured to:
  receive a hypervisor image and an agent from a host server;
  determine whether the agent includes a first signature provided by an authentication server;
  store the hypervisor image and the agent in a cache partition of the non-transitory memory in response to determining that the agent includes the first signature; and
  reboot the mobile device based on the hypervisor image and the agent,
 wherein the processor is further configured to determine whether the hypervisor image includes a second signature provided by the authentication server.

2. The virtualization service providing apparatus of claim 1, wherein the processor is further configured to create a script for installing a hypervisor included in the hypervisor image after rebooting, and to store the created script in a memory.

3. The virtualization service providing apparatus of claim 1, wherein the processor is further configured to transmit a request for rebooting the mobile device into a recovery mode.

4. The virtualization service providing apparatus of claim 3, wherein the processor is further configured to initialize an operating system that reboots the mobile device into the recovery mode.

5. The virtualization service providing apparatus of claim 1, wherein the processor is further configured to determine whether an agent and a script for installing a hypervisor are included in the hypervisor image.

6. The virtualization service providing apparatus of claim 5, wherein the processor is further configured to, in response to the processor determining that the agent exists, transmit an install signal indicating whether the hypervisor is to be installed by the agent, to the recovery service module.

7. The virtualization service providing apparatus of claim 5, wherein the processor is further configured to, in response to the processor determining that the agent does not exist, create a hypervisor partition for storing the hypervisor image in a memory.

8. The virtualization service providing apparatus of claim 5, wherein the processor is further configured to designate a flag value related to execution of the hypervisor, in a memory.

9. A virtualization service providing method for providing a virtualization service in a mobile device, the virtualization service providing method comprising:
receiving a hypervisor image and an agent from a host server;
determining whether the agent includes a first signature provided by an authentication server;
determining whether the hypervisor image includes a second signature provided by the authentication server;
storing the hypervisor image and the agent in a cache partition in response to determining that the agent includes the first signature; and
rebooting the mobile device based on the hypervisor image and the agent.

10. The virtualization service providing method of claim 9, further comprising creating a script for installing a hypervisor included in the hypervisor image after rebooting, and storing the created script in a memory.

11. The virtualization service providing method of claim 9, further comprising transmitting a request for rebooting the mobile device into a recovery mode.

12. The virtualization service providing method of claim 11, further comprising initializing an operating system (OS) that reboots the mobile device into the recovery mode.

13. The virtualization service providing method of claim 12, further comprising determining whether an agent and a script for installing a hypervisor are included in the hypervisor image.

14. The virtualization service providing method of claim 13, further comprising, in response to determining that the agent exists, transmitting an install signal indicating whether the hypervisor is to be installed by the agent.

15. The virtualization service providing method of claim 13, further comprising, in response to determining that the agent does not exist, creating a hypervisor partition for storing the hypervisor image in a memory.

16. The virtualization service providing method of claim 13, further comprising designating a flag value related to execution of the hypervisor, in a memory.

* * * * *